(12) United States Patent
Christianson et al.

(10) Patent No.: US 10,776,573 B2
(45) Date of Patent: Sep. 15, 2020

(54) SYSTEM FOR ASSOCIATING DATA CELLS WITH HEADERS IN TABLES HAVING COMPLEX HEADER STRUCTURES

(71) Applicant: International Business Machines Corporation, Armonk, NY (US)

(72) Inventors: Kyle G. Christianson, Rochester, MN (US); Joshua S. Allen, Durham, NC (US); Hassan Nadim, San Francisco, CA (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 16/136,731

(22) Filed: Sep. 20, 2018

(65) Prior Publication Data

US 2020/0097533 A1   Mar. 26, 2020

(51) Int. Cl.
| | |
|---|---|
| *G06F 17/00* | (2019.01) |
| *G06F 40/18* | (2020.01) |
| *G06F 16/332* | (2019.01) |
| *G06F 40/103* | (2020.01) |
| *G06F 40/177* | (2020.01) |

(52) U.S. Cl.
CPC .......... *G06F 40/18* (2020.01); *G06F 16/3322* (2019.01); *G06F 40/103* (2020.01); *G06F 40/177* (2020.01)

(58) Field of Classification Search
CPC ...... G06F 40/18; G06F 40/103; G06F 40/177; G06F 16/3322; G06F 16/3329
See application file for complete search history.

(56) References Cited

U.S. PATENT DOCUMENTS

| | | | |
|---|---|---|---|
| 6,510,420 B1 | 1/2003 | Cessna et al. | |
| 7,054,871 B2 | 5/2006 | Hu et al. | |
| 7,089,492 B2 | 8/2006 | Anderson | |
| 7,415,481 B2 | 8/2008 | Becker et al. | |
| 7,594,165 B2 | 9/2009 | Chen et al. | |
| 8,335,981 B2 * | 12/2012 | Naibo | G06F 40/18 715/212 |

(Continued)

OTHER PUBLICATIONS

Wikipedia, Contingency Table, May 28, 2018.

(Continued)

*Primary Examiner* — Laurie A Ries
(74) *Attorney, Agent, or Firm* — Terrile, Cannatti & Chambers, LLP; Stephen A. Terrile

(57) ABSTRACT

A method, system and computer-usable medium are disclosed for associating data cells with headers and tables having one or more embedded header structures. In certain embodiments, a table having rows and columns is received, wherein the table includes a plurality of cells, wherein each cell is populated with at least one of a header name, data value, or no information, the table having at least one embedded header. A determination is made as to whether a cell is a header cell or data cell. If the cell is a header cell, a count of consecutive column headers is maintained. A current list of column headers is dynamically updated based on the count of the consecutive column headers. Upon encountering a data cell, the current list of column headers is assigned to the data cell.

17 Claims, 8 Drawing Sheets

(56) References Cited

U.S. PATENT DOCUMENTS

| | | | |
|---|---|---|---|
| 8,914,419 B2* | 12/2014 | Gerard | G06F 40/186 |
| | | | 707/802 |
| 9,286,290 B2 | 3/2016 | Allen et al. | |
| 9,311,371 B2* | 4/2016 | Mohan | G06F 40/18 |
| 9,489,364 B2* | 11/2016 | Rosner | G06F 40/177 |
| 9,524,286 B2 | 12/2016 | Evans et al. | |
| 9,715,487 B2 | 7/2017 | Rapp | |
| 9,734,181 B2 | 8/2017 | Wang et al. | |
| 9,785,830 B2 | 10/2017 | Hausmann et al. | |
| 9,940,380 B2 | 4/2018 | Fourny et al. | |
| 10,235,437 B2* | 3/2019 | Diwan | G06F 16/254 |
| 2003/0097384 A1 | 5/2003 | Hu et al. | |
| 2006/0117051 A1* | 6/2006 | Chin | G06F 40/177 |
| 2006/0156221 A1 | 7/2006 | Chen et al. | |
| 2007/0288412 A1* | 12/2007 | Linehan | G06Q 10/06 |
| | | | 706/45 |
| 2009/0044090 A1 | 2/2009 | Gur et al. | |
| 2009/0313205 A1 | 12/2009 | Hino et al. | |
| 2011/0289398 A1* | 11/2011 | Chin | G06F 40/177 |
| | | | 715/227 |
| 2012/0303630 A1* | 11/2012 | Gelfand | G06F 16/13 |
| | | | 707/741 |
| 2014/0369602 A1 | 12/2014 | Vleier et al. | |
| 2015/0007010 A1* | 1/2015 | Byron | G06F 40/177 |
| | | | 715/227 |
| 2015/0379057 A1* | 12/2015 | Wang | G06F 16/221 |
| | | | 707/723 |
| 2016/0292240 A1 | 10/2016 | Diwan et al. | |
| 2017/0329749 A1 | 11/2017 | Milward et al. | |
| 2017/0371955 A1 | 12/2017 | Allen et al. | |
| 2018/0060292 A1* | 3/2018 | Rullan | G06F 40/18 |
| 2019/0138588 A1* | 5/2019 | Silk | G06F 16/27 |
| 2019/0340240 A1* | 11/2019 | Duta | G06F 40/284 |
| 2019/0370540 A1 | 12/2019 | Freed et al. | |

OTHER PUBLICATIONS

Wikipedia, Pivot Table, May 28, 2018, Jun. 20, 2018.

Jim Gray et al., "Data cube: A relational aggregation operator generalizing group-by, cross-tab, and sub-totals," Data mining and knowledge discovery 1, No. 1 (1997): 29-53.

Jianying Hu et al., "Table structure recognition and its evaluation," In Document Recognition and Retrieval VIII, vol. 4307, pp. 44-56. International Society for Optics and Photonics, 2000.

David W. Embley et al., "Table-processing paradigms: a research survey," International Journal of Document Analysis and Recognition (IJDAR) 8, No. 2-3 (2006): 66-86.

Docparser.com, "How to parse tables with complex layouts?" printed Jul. 9, 2018, https://support.docparser.com/article/1312-how-to-parse-tables-with-complex-layouts.

Svitlana Vakulenko et al., "TableQA: Question Answering on Tabular Data," Aug. 30, 2017, https://arvix.org/pdf/1705.06504.pdf.

Ana Costa E Silva et al., Design of an end-to-end method to extract information from tables, International Journal of Document Analysis and Recognition (IJDAR) 8, No. 2-3 (2006): 144-171.

Chris West, JavaScript Snippet—Convert HTML Table to 2D Array, Chris West's Blog, http://cwestblog.com/2016/08/21/javascript-snippet-convert-html-table-to-2d-array/, Aug. 21, 2016.

Sharad Seth et al., "Analysis and taxonomy of col. header categories for web tables," Proceedings of the 9th IAPR International Workshop on Document Analysis Systems (DAS '10). ACM, New York, NY, USA, 81-88.

George Nagy et al., "Data extraction from web tables: The devil is in the details," Document Analysis and Recognition (ICDAR), 2011 International Conference on, pp. 242-246. IEEE, 2011.

Experts-Exchange.com, convert html table into an array, https://www.experts-exchange.com/questions/21911184/convert-html-table-into-an-array.html, printed Sep. 4, 2018.

Rob High, "The Era of Cognitive Systems: An Inside Look at IBM Watson and How it Works," IBM Redbooks, 2012.

Michael Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexploreieee.org/xpl/tocresult.jsp?reload=true&isnumber=6177717.

Sebastian Raschka, About Feature Scaling and Normalization—and the effect of standardization for machine learning algorithms, https://sebastianraschka.com/Articles/2014_about_feature_scaling.html, Jul. 11, 2014.

Mitch Sanders, Machine Learning Pre-Processing: Scaling, Standardizing, Normalizing, http://datareality.blogspot.com/2016/11/scaling-normalizing-standardizing-which.html. Nov. 29, 2016.

Michael J. Cafarella et al., Uncovering the Relational Web, Jun. 13, 2008 http://sirrice.github.io/files/papers/relweb-webdb08.pdf.

Jing Fang et al., Table Header Detection and Classification, Proceedings of the Twenty-Sixth AAAI Conference on Artiticial Intelligence, Toronto, Ontario, Canada, Jul. 22-26, 2012 https://pdfs.semanticscholar.org/2e4c/cf5445490a176dabdt77a5e39cb11f88970c.pdf.

Jingjing Wang et al., Understanding Tables on the Web, 2012 https://homes.cs.washington.edu/~jwang/publications/webtables.pdf.

Xing Wei et al., Table Extraction for Answer Retrieval, Abstract, Inf Retrieval, vol. 9, Issue 5, pp. 589-611, Nov. 2006, https://rd.springer.com/content/pdf/10.1007%2Fs10791-006-9005-5.pdf.

George Nagy et al., End-to-End Conversion of HTML Tables for Populating a Relational Database, Abstract, 2014 11th IAPR International Workshop on Document Analysis Systems, Apr. 7-10, 2014, http://ieeexplore.ieee.org/document/6831002/.

Teacher'S Tech, Mar. 19, 2018, (https://www.youtube.com/watch?v=k1VUZEVuDJ8).

Cheusheva, Svetlana, "How to convert Excel tables to HTML" Sep. 11, 2018, https://www.ablebits.com/office-addins-blog/2014/03/21/convert-excel-html/.

CCR Data Ltd., "Data Cleansing—Deduplication in Excel" Jan. 26, 2012, (https://www.youtube.com/watch?v= 6HNX_tk2VxU).

Contextures Inc., "Change Horizontal Data to Vertical" Jan. 8, 2011, (https://www.youtube.com/watch?v=ZWu5MetlwlE).

\* cited by examiner

```
|  | Imported | Domestic |
|  | Beans | Peas | Carrots | Tomatoes |
| Rochester |
| Wholesale | $150 | $200 | $120 | $130 |
| Retail | $350 | $420 | $330 | $250 |
| Raleigh |
| Wholesale | $510 | $850 | $640 | $700 |
| Retail | $650 | $900 | $730 | $800 |
```

305 ←

|    | C1        | C2       | C3       | C4      | C5       |
|----|-----------|----------|----------|---------|----------|
| R1 |           |          |          |         |          |
| R2 |           | IMPORTED | DOMESTIC |         |          |
| R3 |           | BEANS    | PEAS     | CARROTS | TOMATOES |
| R4 | ROCHESTER |          |          |         |          |
| R5 | WHOLESALE | $150     | $200     | $120    | $130     |
| R6 | RETAIL    | $350     | $420     | $330    | $250     |
| R7 | RALEIGH   |          |          |         |          |
| R8 | WHOLESALE | $510     | $850     | $640    | $700     |
|    | RETAIL    | $650     | $900     | $730    | $800     |

310 ←

```
[
 {"cell_value": "$150", "cell_headers": ["Wholesale", "Imported", "Beans", "Rochester"]},
 {"cell_value": "$200", "cell_headers": ["Wholesale", "Imported", "Peas", "Rochester"]},
 {"cell_value": "$120", "cell_headers": ["Wholesale", "Domestic", "Carrots", "Rochester"]},
 {"cell_value": "$130", "cell_headers": ["Wholesale", "Domestic", "Tomatoes", "Rochester"]},
 {"cell_value": "$350", "cell_headers": ["Retail", "Imported", "Beans", "Rochester"]},
 {"cell_value": "$420", "cell_headers": ["Retail", "Imported", "Peas", "Rochester"]},
 {"cell_value": "$330", "cell_headers": ["Retail", "Domestic", "Carrots", "Rochester"]},
 {"cell_value": "$250", "cell_headers": ["Retail", "Domestic", "Tomatoes", "Rochester"]},
 {"cell_value": "$510", "cell_headers": ["Wholesale", "Imported", "Beans", "Raleigh"]},
 {"cell_value": "$850", "cell_headers": ["Wholesale", "Imported", "Peas", "Raleigh"]},
 {"cell_value": "$640", "cell_headers": ["Wholesale", "Domestic", "Carrots", "Raleigh"]},
 {"cell_value": "$700", "cell_headers": ["Wholesale", "Domestic", "Tomatoes", "Raleigh"]},
 {"cell_value": "$650", "cell_headers": ["Retail", "Imported", "Beans", "Raleigh"]},
 {"cell_value": "$900", "cell_headers": ["Retail", "Imported", "Peas", "Raleigh"]},
 {"cell_value": "$730", "cell_headers": ["Retail", "Domestic", "Carrots", "Raleigh"]},
 {"cell_value": "$800", "cell_headers": ["Retail", "Domestic", "Tomatoes", "Raleigh"]}
]
```

*Figure 7*

```
results = initially empty array in which the results will be appended
table = 2D array representing the table. Colspans and Rowspans have been expanded.
num_rows = number of rows in the table
num_cols = number of columns in the table
col_headers_per_col = nested array of arrays initialized with num_cols empty arrays
        Items in outer array represent the columns.
        Items in inner arrays represent the current headers of the column.
consec_col_headers_per_col = array initialized with num_cols zeroes for row in range(num_rows):
   row_headers = []
   consec_row_headers = 0 for col in range(num_cols):
      if table[row][col] is header:
         consec_row_headers += 1
         consec_col_headers_per_col[col] += 1 row_index_to_del = len(row_headers) - consec_row_headers
         if row_index_to_del >= 0:
            del row_headers[row_index_to_del]
         col_index_to_del = len(col_headers_per_col[col]) - consec_col_headers_per_col[col])
         if col_index_to_del >= 0:
            del col_headers_per_col[col][col_index_to_del]

add cell value to end of row_headers
         add cell value to end of col_headers_per_col[col]

else:
         # this is a data cell, so add it to the result and reset the consecutive headers
         consec_row_headers = 0
         consec_col_headers_per_col[col] = 0
         cell = {} # new dictionary
         cell["cell_value"] = value of table[row][col]
         cell["cell_headers"] = row_headers + col_headers_per_col[col] #list of current headers
         results.append(cell)
```

*Figure 8*

SYSTEM FOR ASSOCIATING DATA CELLS WITH HEADERS IN TABLES HAVING COMPLEX HEADER STRUCTURES

BACKGROUND OF THE INVENTION

Field of the Invention

The present invention relates in general to the field of computers and similar technologies, and in particular to software utilized in this field. Still more particularly, it relates to a method, system and computer-usable medium for associating data cells with headers in tables having complex header structures.

Description of the Related Art

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating knowledge management systems which may take an input, analyze it, and return results indicative of the most probable results to the input. Knowledge management systems provide automated mechanisms for searching through a knowledge base with numerous sources of content, e.g., electronic documents, and analyze them with regard to an input to determine a result and a confidence measure as to how accurate the result is in relation to the input.

One such knowledge management system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY OF THE INVENTION

A method, system and computer-usable medium are disclosed for associating data cells with headers and tables having one or more embedded header structures. In certain embodiments, the method comprises: receiving a table having rows and columns, wherein the table includes a plurality of cells, wherein each cell is populated with at least one of a header name, data value, or no information, the table having at least one embedded header; determining whether a cell is a header cell or data cell; if the cell is a header cell, maintaining a count of consecutive column headers; dynamically updating a current list of column headers based on the count of the consecutive column headers; and upon encountering a data cell, assigning the current list of column headers to the data cell.

Certain embodiments relate to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving a table having rows and columns, wherein the table includes a plurality of cells, wherein each cell is populated with one of a header name, data value, or no information, the table having at least one embedded header; determining whether a cell is a header cell or data cell; if the cell is a header cell, maintaining a count of consecutive column headers; dynamically updating a current list of column headers based on the count of the consecutive column headers; and upon encountering a data cell, assigning the current list of column headers to the data cell.

Certain embodiments relate to a non-transitory, computer-readable storage medium embodying computer program code, the computer program code comprising computer executable instructions configured for: receiving a table having rows and columns, wherein the table includes a plurality of cells, wherein each cell is populated with one of a header name, data value, or no information, the table having at least one embedded header; determining whether a cell is a header cell or data cell; if the cell is a header cell, maintaining a count of consecutive column headers; dynamically updating a current list of column headers based on the count of the consecutive column headers; and upon encountering a data cell, assigning the current list of column headers to the data cell.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 7 shows one example of a data structure that may be generated from the table information shown in FIG. 3 using certain embodiments of the header label assignment system.

FIG. 8 depicts one example of pseudocode that may be used as a basis to implement certain embodiments of the header label assignment system.

DETAILED DESCRIPTION

Figure 1:
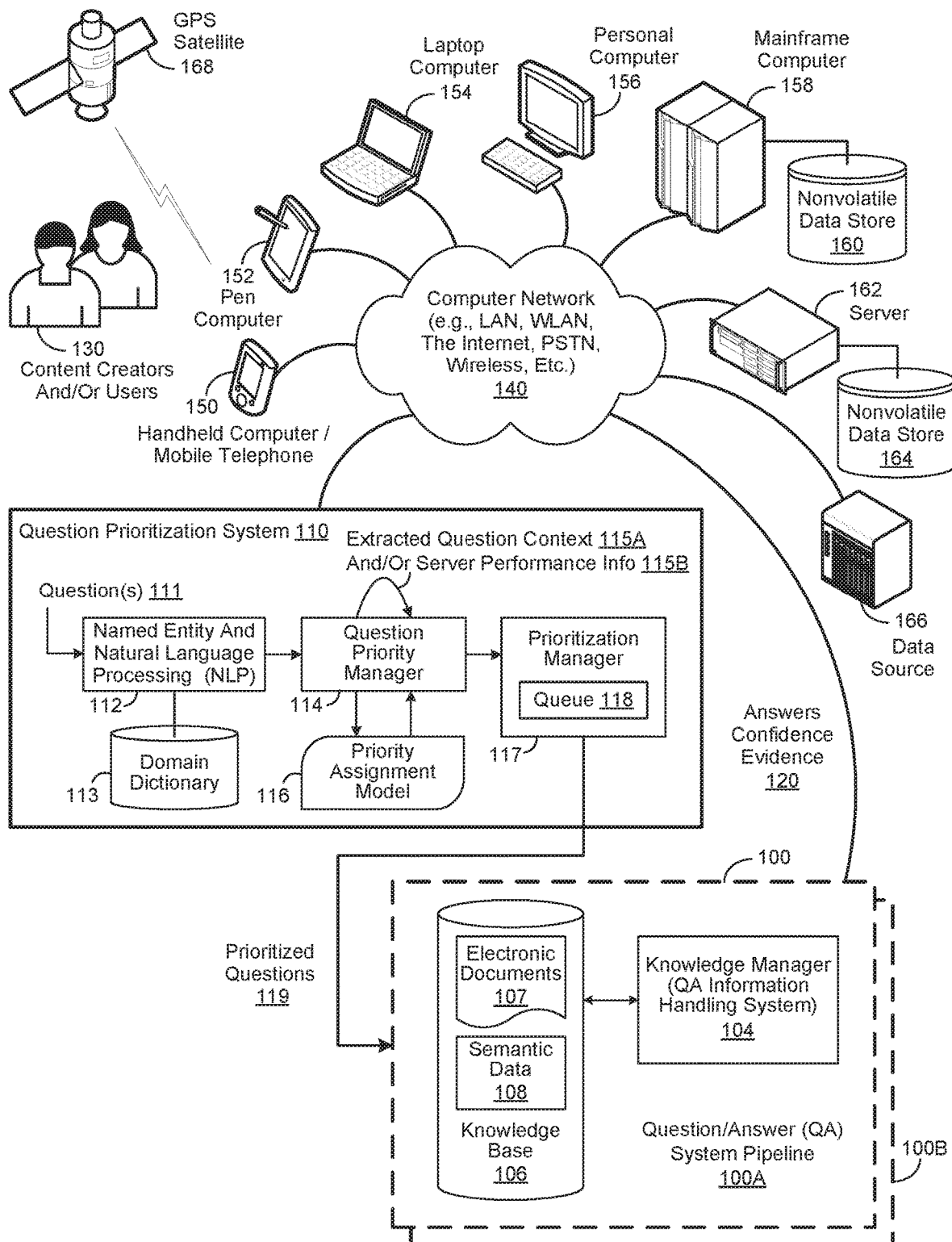
FIG. 1 shows a schematic diagram of one illustrative embodiment of a question/answer (QA) system.

The present invention may be a system, a method, and/or a computer program product. In addition, selected aspects of the present invention may take the form of an entirely hardware embodiment, an entirely software embodiment (including firmware, resident software, microcode, etc.), or an embodiment combining software and/or hardware aspects that may all generally be referred to herein as a "circuit," "module" or "system." Furthermore, aspects of the present invention may take the form of computer program product embodied in a computer-readable storage medium, or media, having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a dynamic or static random access memory (RAM), a read-only memory (ROM), an erasable programmable read-only memory (EPROM or Flash memory), a magnetic storage device, a portable Compact Disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer-readable program instructions may execute entirely on the user's computer, partly on the user's computer, as a stand-alone software package, partly on the user's computer and partly on a remote computer, or entirely on the remote computer or server or cluster of servers. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a schematic diagram of one illustrative embodiment of a QA system 100 and a question prioritization system 110 connected to a computer network 140 to operate as a conversational system. The QA system 100 includes a knowledge manager 104 that is connected to a knowledge base 106 and configured to provide QA generation functionality for one or more content creators and/or users 130 who submit content across the network 140 to the QA system 100. To assist with efficient sorting and presentation of questions to the QA system 100, the question prioritization system 110 may be connected to the computer network 140 to receive user questions, and may include a plurality of sub-systems which interact with cognitive systems, like the QA system 100, to prioritize questions or requests being submitted to the QA system 100.

The Named Entity sub-system 112 receives and processes each question 111 by using natural language processing (NLP) to analyze each question and extract question topic information contained in the question, such as named entities, phrases, urgent terms, and/or other specified terms which are stored in one or more domain entity dictionaries 113. By leveraging a plurality of pluggable domain dictionaries 113 relating to different domains or areas (e.g., travel, healthcare, electronics, game shows, financial services, etc.), the domain dictionary 113 enables critical and urgent words (e.g., "threat level") from different domains (e.g., "travel") to be identified in each question based on their presence in the domain dictionary 113. To this end, the Named Entity sub-system 112 may use an NLP routine to identify the question topic information in each question. As used herein, "NLP" broadly refers to the field of computer science, artificial intelligence, and linguistics concerned with the interactions between computers and human (natural) languages. In this context, NLP is related to the area of human-computer interaction and Natural Language understanding by computer systems that enable computer systems to derive meaning from human or Natural Language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 113.

The Question Priority Manager sub-system 114 performs additional processing on each question to extract question context information 115A. In addition, or in the alternative, the Question Priority Manager sub-system 114 may also extract server performance information 115B for the question prioritization system 110 and/or QA system 100. In selected embodiments, the extracted question context information 115A may include data that identifies the user context and location when the question was submitted or received. For example, the extracted question context information 115A may include data that identifies the user who submitted the question (e.g., through login credentials), the device or computer which sent the question, the channel over which the question was submitted, or any combination thereof. Other examples may include the location of the user or device that sent the question, any special interest location indicator (e.g., hospital, public-safety answering point, etc.), other context-related data for the question, or any combination thereof. In certain embodiments, the location information is determined through the use of a Geographical Positioning System (GPS) satellite 168. In these embodiments, a handheld computer or mobile telephone 150, or other device, uses signals transmitted by the GPS satellite 168 to generate location information, which in turn is provided via the computer network 140 to the Question Priority Manager sub-system 114 for processing.

In various embodiments, the source for the extracted context information 115 may be a data source 166 accessed through the computer network 140. Examples of a data source 166 include systems that provide telemetry information, such as medical information collected from medical equipment used to monitor a patient's health, environment information collected from a facilities management system, or traffic flow information collected from a transportation monitoring system. In certain embodiments, the data source 166 may be a storage area network (SAN) or other network-based repositories of data.

In various embodiments, the data source 166 may provide data directly or indirectly collected from "big data" sources. In general, big data refers to a collection of datasets so large and complex that traditional database management tools and data processing approaches are inadequate. These datasets can originate from a wide variety of sources, including computer systems (e.g., 156, 158, 162), mobile devices (e.g., 150, 152, 154), financial transactions, streaming media, social media, as well as systems (e.g., 166) commonly associated with a wide variety of facilities and infrastructure (e.g., buildings, factories, transportation systems, power grids, pipelines, etc.). Big data, which is typically a combination of structured, unstructured, and semi-structured data poses multiple challenges, including its capture, curation, storage, transfer, search, querying, sharing, analysis and visualization.

The Question Priority Manager sub-system 114 may also determine or extract selected server performance data 115B for the processing of each question. In certain embodiments, the server performance information 115B may include operational metric data relating to the available processing resources at the question prioritization system 110 and/or QA system 100, such as operational or run-time data, CPU utilization data, available disk space data, bandwidth utilization data, and so forth. As part of the extracted information 115A/B, the Question Priority Manager sub-system 114 may identify the Service Level Agreement (SLA) or Quality of Service (QoS) processing requirements that apply to the question being analyzed, the history of analysis and feedback for the question or submitting user, and the like. Using the question topic information and extracted question context 115A and/or server performance information 115B, the Question Priority Manager sub-system 114 is configured to populate feature values for the Priority Assignment Model 116. In various embodiments, the Priority Assignment Model 116 provides a machine learning predictive model for generating target priority values for the question, such as by using an artificial intelligence (AI) approaches known to those of skill in the art. In certain embodiments, the AI logic is used to determine and assign a question urgency value to each question for purposes of prioritizing the response processing of each question by the QA system 100.

The Prioritization Manager sub-system 117 performs additional sort or rank processing to organize the received questions based on at least the associated target priority values such that high priority questions are put to the front of a prioritized question queue 118 for output as prioritized questions 119. In the question queue 118 of the Prioritization Manager sub-system 117, the highest priority question is placed at the front of the queue for delivery to the assigned QA system 100. In selected embodiments, the prioritized questions 119 from the Prioritization Manager sub-system 117 that have a specified target priority value may be assigned to a particular pipeline (e.g., QA system pipeline 100A, 100B) in the QA system 100. As will be appreciated, the Prioritization Manager sub-system 117 may use the question queue 118 as a message queue to provide an asynchronous communications protocol for delivering prioritized questions 119 to the QA system 100. Consequently, the Prioritization Manager sub-system 117 and QA system 100 do not need to interact with a question queue 118 at the same time by storing prioritized questions in the question queue 118 until the QA system 100 retrieves them. In this way, a wider asynchronous network supports the passing of prioritized questions 119 as messages between different QA system pipelines 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager sub-system 117 may be configured to convert oversubscribing questions into asynchronous responses, even if they were asked in a synchronized fashion.

The QA system 100 may include one or more QA system pipelines 100A, 100B, each of which includes a computing device 104 comprising one or more processors and one or more memories. The QA system pipelines 100A, 100B may likewise include potentially any other computing device elements generally known in the art including buses, storage devices, communication interfaces, and the like. In various embodiments, these computing device elements may be implemented to process questions received over the network 140 from one or more content creator and/or users 130 at computing devices (e.g., 150, 152, 154, 156, 158, 162). In certain embodiments, the one or more content creator and/or users 130 are connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable QA generation functionality for one or more content users 130. Other embodiments of QA system 100 may be used with components, systems, sub-systems, and/or devices other than those that are depicted herein.

In each QA system pipeline 100A, 100B, a prioritized question 119 is received and prioritized for processing to generate an answer 120. In sequence, prioritized questions 119 are de-queued from the shared question queue 118, from which they are de-queued by the pipeline instances for processing in priority order rather than insertion order. In selected embodiments, the question queue 118 may be implemented based on a "priority heap" data structure. During processing within a QA system pipeline (e.g., 100A, 100B), questions may be split into multiple subtasks, which run concurrently. In various embodiments, a single pipeline instance may process a number of questions concurrently, but only a certain number of subtasks. In addition, each QA system pipeline 100A, 100B may include a prioritized queue (not shown) to manage the processing order of these subtasks, with the top-level priority corresponding to the time that the corresponding question started (i.e., earliest has highest priority). However, it will be appreciated that such internal prioritization within each QA system pipeline 100A, 100B may be augmented by the external target priority values generated for each question by the Question Priority Manager sub-system 114 to take precedence, or ranking priority, over the question start time. In this way, more important or higher priority questions can "fast track" through a QA system pipeline 100A, 100B if it is busy with already-running questions.

In the QA system 100, the knowledge manager 104 may be configured to receive inputs from various sources. For example, knowledge manager 104 may receive input from the question prioritization system 110, network 140, a knowledge base or corpus of electronic documents 107 or other data, semantic data 108, content creators, and/or users 130, and other possible sources of input. In selected embodiments, some or all of the inputs to knowledge manager 104 may be routed through the network 140 and/or the question prioritization system 110. The various computing devices (e.g., 150, 152, 154, 156, 158, 162) on the network 140 may include access points for content creators and/or users 130. Some of the computing devices may include devices for a database storing a corpus of data as the body of information used by the knowledge manager 104 to generate answers to cases. The network 140 may include local network connections and remote connections in various embodiments, such that knowledge manager 104 may operate in environments of any size, including local (e.g., a LAN) and global (e.g., the Internet). Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, a content creator 130 creates content (e.g., a document) in a knowledge base 106 for use as part of a corpus of data used in conjunction with knowledge manager 104. In selected embodiments, the knowledge base 106 may include any file, text, article, or source of data (e.g., scholarly articles, dictionary definitions, encyclopedia references, and the like) for use by the knowledge manager 104. Content users 130 may access the knowledge manager 104 via a network connection or an Internet connection to the network 140, and may input questions to the knowledge manager 104 that may be answered by the content in the corpus of data.

As further described below, when a process evaluates a given section of a document for semantic content, the process can use a variety of conventions to query it from the knowledge manager 104. One convention is to send a well-formed question. As used herein, semantic content broadly refers to content based upon the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., Natural Language questions, etc.) to the knowledge manager 104. In various embodiments, the knowledge manager 104 may interpret the question and provide a response to the content user containing one or more answers to the question. In some embodiments, the knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 119 and the language used in each of the portions of the corpus of data found during the application of the queries using a variety of reasoning algorithms. There may be hundreds or even thousands of reasoning algorithms applied, each of which performs different analysis (e.g., comparisons), and generates a score. For example, certain reasoning algorithms may look at the matching of terms and synonyms within the language of the input question and the found portions of the corpus of data. Other reasoning algorithms may look at temporal or spatial features in the language, while yet others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 120 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An inside Look at IBM Watson and How it Works" by Rob High, IBM Redbooks, 2012.

Types of information processing systems that can utilize QA system 100 range from small handheld devices, such as handheld computer/mobile telephone 150 to large mainframe systems, such as mainframe computer 158. Examples of handheld computer 150 include personal digital assistants (PDAs), personal entertainment devices, such as MP3 players, portable televisions, and Compact Disc players. Other examples of information processing systems include pen, or tablet, computer 152, laptop, or notebook, computer 154, personal computer system 156, server 162, and mainframe computer 158.

As shown, the various information processing systems can be networked together using computer network 140. Types of computer network 140 that can be used to interconnect the various information processing systems include PANs, LANs, Wireless Local Area Networks (WLANs), the Internet, the PSTN, other wireless networks, and any other network topology that can be used to interconnect the information processing systems.

Figure 2:
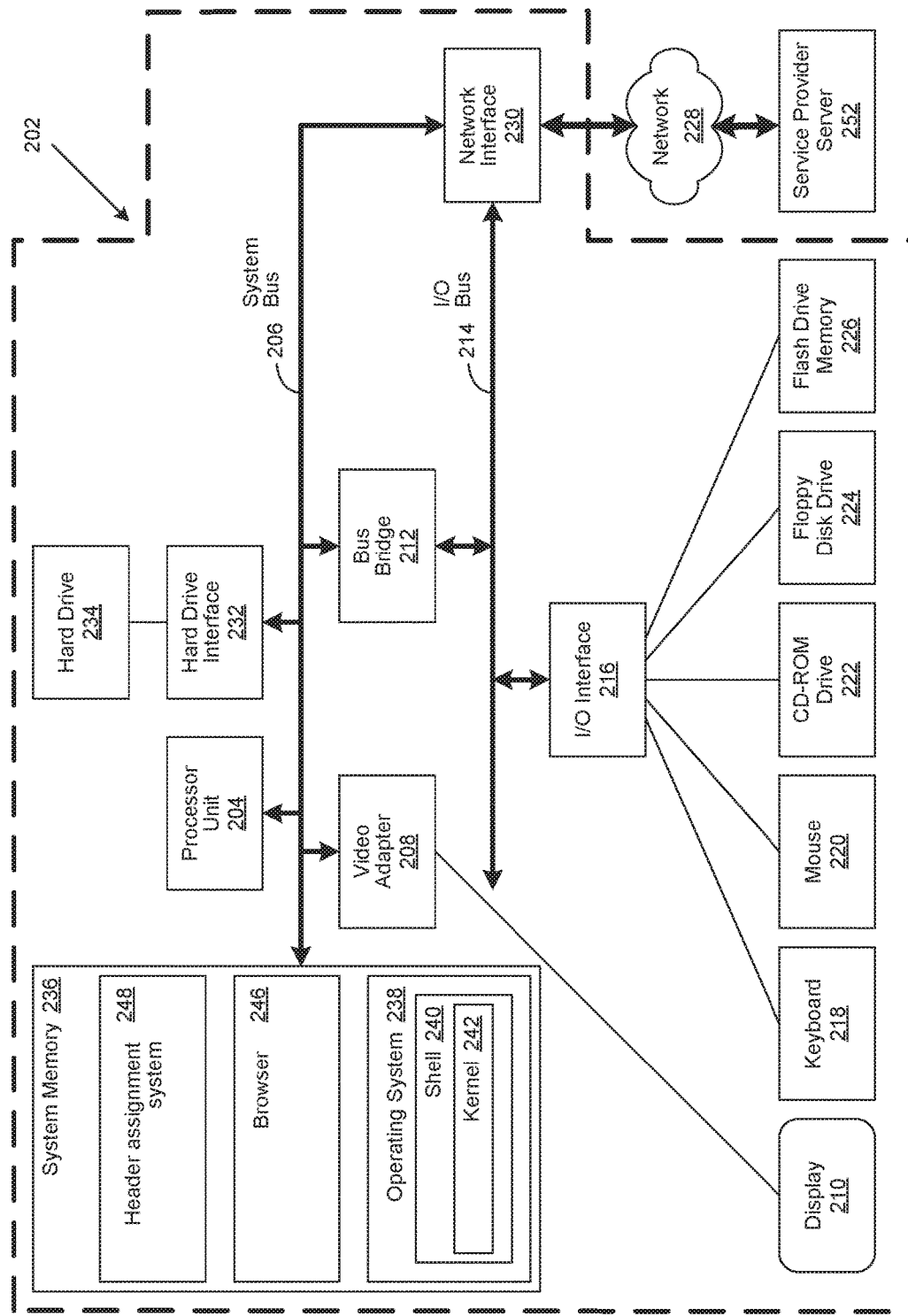
FIG. 2 shows a simplified block diagram of an information processing system capable of performing computing operations.

In selected embodiments, the information processing systems include nonvolatile data stores, such as hard drives and/or nonvolatile memory. Some of the information processing systems may use separate nonvolatile data stores. For example, server 162 utilizes nonvolatile data store 164, and mainframe computer 158 utilizes nonvolatile data store 160. The nonvolatile data store can be a component that is external to the various information processing systems or can be internal to one of the information processing systems. An illustrative example of an information processing system showing an exemplary processor and various components commonly accessed by the processor is shown in FIG. 2.

In various embodiments, the QA system 100 is implemented to receive a variety of data from various computing devices (e.g., 150, 152, 154, 156, 158, 162) and data sources 166, which in turn is used to perform QA operations described in greater detail herein. In certain embodiments, the QA system 100 may receive a first set of information from a first computing device (e.g., laptop computer 154). The QA system 100 then uses the first set of data to perform QA processing operations resulting in the generation of a second set of data, which in turn is provided to a second computing device (e.g., server 162). In response, the second computing device may process the second set of data to generate a third set of data, which is then provided back to the QA system 100. In turn, the QA system may perform additional QA processing operations on the third set of data to generate a fourth set of data, which is then provided to the first computing device.

In certain embodiments, a first computing device (e.g., server 162) may receive a first set of data from the QA system 100, which is then processed and provided as a second set of data to another computing device (e.g., mainframe 158). The second set of data is processed by the second computing device to generate a third set of data, which is provided back to the first computing device. The second computing device then processes the third set of data to generate a fourth set of data, which is then provided to the QA system 100, where it is used to perform QA operations described in greater detail herein.

In one embodiment, the QA system may receive a first set of data from a first computing device (e.g., handheld computer/mobile device 150), which is then used to perform QA operations resulting in a second set of data. The second set of data is then provided back to the first computing device, where it is used to generate a third set of data. In turn, the third set of data is provided back to the QA system 100, which then provides it to a second computing device (e.g., mainframe computer 158), where it is used to perform post processing operations.

As an example, a content user 130 may ask the question, "I'm looking for a good pizza restaurant nearby." In response, the QA system 100 may provide a list of three such restaurants in a half mile radius of the content user. In turn, the content user 130 may then select one of the recommended restaurants and ask for directions, signifying their intent to proceed to the selected restaurant. In this example, the list of recommended restaurants, and the restaurant the content user 130 selected, would be the third set of data provided to the QA system 100. To continue the example, the QA system 100 may then provide the third set of data to the second computing device, where it would be processed to generate a database of the most popular restaurants, by classification, location, and other criteria.

In various embodiments the exchange of data between various computing devices (e.g., 150, 152, 154, 156, 158, 162) results in more efficient processing of data as each of the computing devices can be optimized for the types of data it processes. Likewise, the most appropriate data for a particular purpose can be sourced from the most suitable computing device (e.g., 150, 152, 154, 156, 158, 162), or data source 166, thereby increasing processing efficiency. Skilled practitioners of the art will realize that many such embodiments are possible and that the foregoing is not intended to limit the spirit, scope or intent of the invention.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disc-Read-Only Memory (CD-ROM) drive 222, a floppy disk drive 224, and a flash drive memory 226. The format of the ports connected to I/O interface 216 may be any known to those skilled in the art of computer architecture, including, but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, the information processing system 202 is able to access a service provider server 252 to implement the present invention.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. In certain embodiments, system memory 236 may also include a Browser 246 having program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, system memory 236 may also include a header label assignment system 248. In various embodiments, header label assignment system 248 includes code for implementing the processes described hereinbelow. In certain embodiments, the information processing system 202 is able to download the header label assignment system 248 from a service provider server 252.

The hardware elements depicted in the information processing system 202 are not intended to be exhaustive, but rather are representative to highlight components that may be used to implement the present invention. For instance, the information processing system 202 may include alternate memory storage devices such as magnetic cassettes, DVDs, Bernoulli cartridges, and the like. These and other variations are intended to be within the spirit, scope and intent of the present invention.

The header label assignment system 248 is designed with an appreciation that tables having data that can be used in an information processing system may include complex header structures. The design and operation of the header label assignment system 248 also appreciates that such complex header structures may limit the ability of QA system 100 to analyze information provided in such tables.

In appreciation of these limitations, certain embodiments of the header label assignment system 248 execute operations that automatically generate data structures that assign headers within a complex table to corresponding data cells, even in tables having embedded headers. As used herein, a table having an embedded header is a table in which one or more header cells have data cells both before and after a header cell. In certain embodiments, the data structures generated by the header label assignment system 248 may be used in training a QA system so that the QA system is better prepared to analyze and provide answers to natural language questions.

Figure 3:
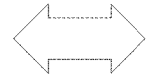
FIG. 3 depicts one example of tabular information that may be used to provide an understanding of certain embodiments of a header label assignment system.

FIG. 3 depicts one example of tabular information that may be used to provide an understanding of certain embodiments of the disclosed system. In this example, the information is arranged as cells in a two-dimensional data structure of rows and columns. In this example, table 305 shows the information in a text file format while table 310 shows the information in a tabular format. The same data is expressed in both tables 305 and 310. For purposes of the following discussion, however, table 310 uses with its implicit column numbers C1-C5 and row numbers R1-R6 to describe positions of cells within the table 310. It will be recognized that the column numbers and row numbers shown in table 310 are provided for indexing purposes and are not necessarily included as cells in either table 305 or 310.

In certain embodiments, each cell of a table is populated with at least one of a header name, data value, or no information. With reference to the example shown in table 310, "header names" are shown in bold type, "data cells" include dollar values, and "no information" is shown as an empty cell place holder. Certain cells also constitute headers for other header cells, which are shown in bold italics. Certain embodiments of the header label assignment system recognize that such headers for other header cells, referenced herein as "labels," may be used to give additional context to data cells of the table.

Using indices for the relative position of cells within the table 310 as examples, the header name "NYC BOROUGH" is located within the table at indexed locations R1C1 and R2C1. The header name "SPEEDING TICKETS" is located within the table at indexed locations R1C2 and R1C3. The header name "PARKING TICKETS" is located within the table at indexed locations R1C4 and R1C5. The header name "CAR" is located within the table at indexed location R2C2. The data cell "1500" is located within the table at R4C2.

For a computer system to intelligently understand and search data within tables, it needs to correctly identify the headers which apply context to each data cell. For example, in order to answer the question "What was the retail value of peas in Raleigh?" from table 310, the system must associate data cell "$900" with the headers "Peas", "Raleigh", and "Retail. It must not associate "Rochester" with "$900", despite the fact that both "Raleigh" and "Rochester" are in the same column C1 in the table 310, and both precede the occurrence of "$900". Otherwise "$900" would show up for search results containing "Rochester" since it is the first occurring city header name.

Figure 4:
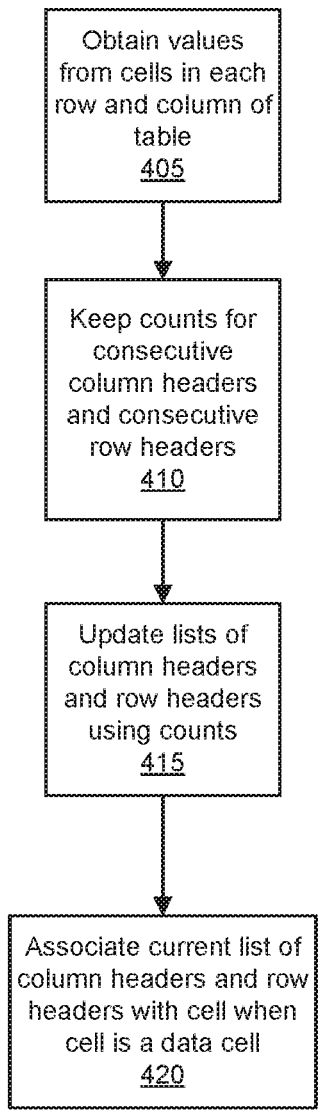
FIG. 4 is a flowchart depicting exemplary operations that may be executed in certain embodiments of the header label assignment system.

FIG. 4 is a flowchart depicting exemplary operations that may be executed in certain embodiments of the header label assignment system. In certain embodiments, the operations shown in FIG. 4 associate table headers to data cells and can handle more complex tables including nested headers such as those shown in table 310. The formatted data structure output is easily consumed by search engines, QA systems, etc.

In certain embodiments, it is assumed that each table cell is already empty or labeled as either a header or data. In certain embodiments, the header label assignment system may make a single pass over the two-dimensional table array and associate each data cell with its appropriate headers. In certain embodiments, values are obtained from the cells in each row and column of the table at operation 405. In certain embodiments, a current list of column headers is maintained. In certain embodiments, a current list of row headers is also maintained.

At operation 410, the header label assignment system keeps a count of consecutive column headers and, in certain embodiments, a count of consecutive row headers. At operation 415, the list of column headers is updated based on the count of consecutive column headers. In certain embodiments, the list of row headers is also updated at operation 415 based on the count of consecutive row headers. In certain embodiments, when a data cell is encountered, headers from the current list of column headers are associated with the data cell at operation 420. In certain embodiments, headers from the current list of row headers are also associated with the data cell at operation 420. In certain embodiments, the operations shown in FIG. 4 are continued until all data cells of the table have been associated with one or more headers. The resulting data structure in which each cell is associated with at least one header may be stored for subsequent ingestion and use by, for example, a QA system and/or search engine.

Figure 5:
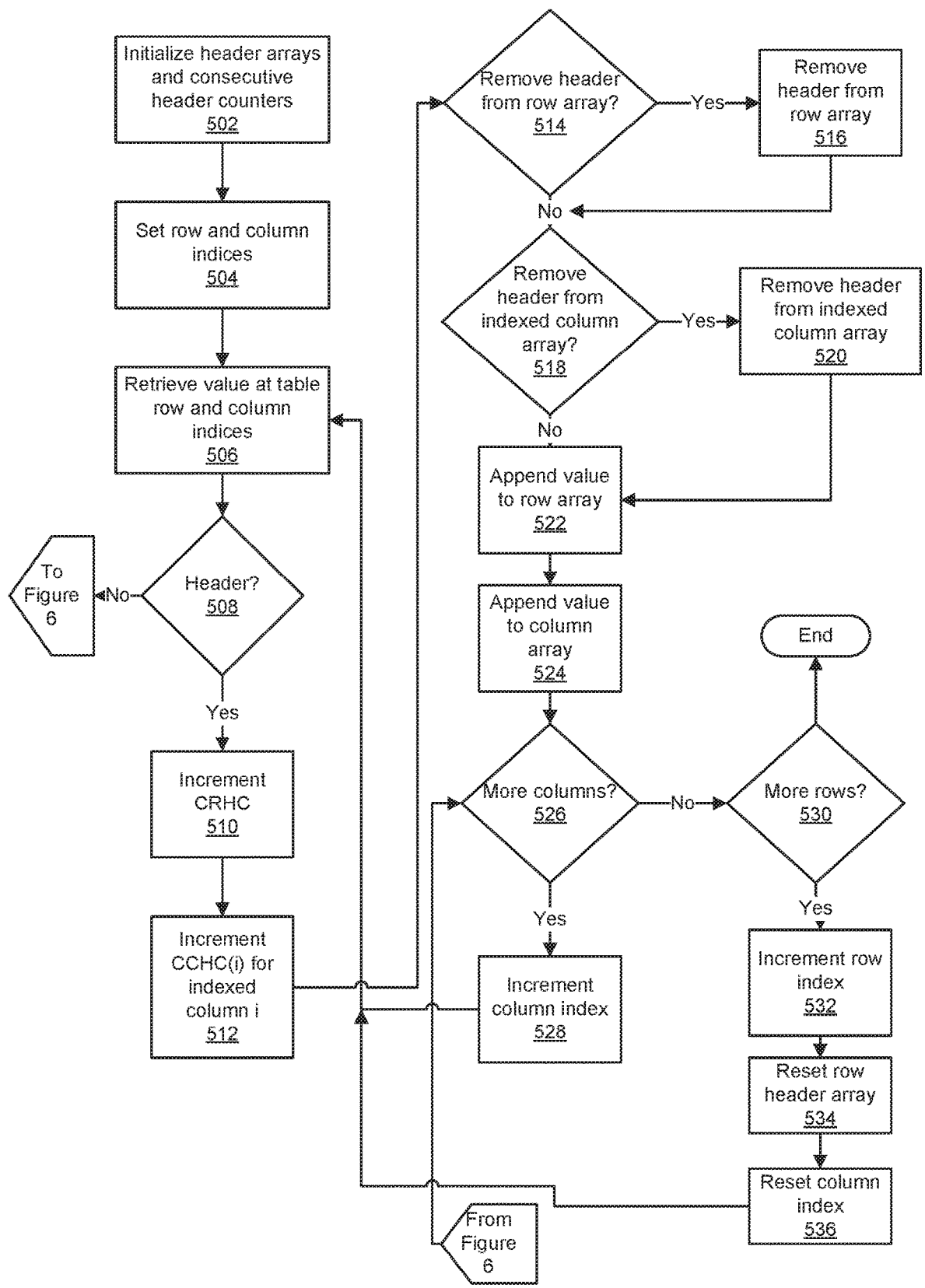
FIG. 5 is another flowchart depicting exemplary operations that may be executed in certain embodiments of the header label assignment system.

FIG. 5 is another flowchart depicting exemplary operations that may be executed in certain embodiments of the header label assignment system. In certain embodiments, the header label assignment system initializes empty header arrays at operation 502. In certain embodiments, the header label assignment system initializes an empty column header array for each column of the table. In certain embodiments, the header label assignment system also initializes an empty row header array that is used as each column of a row is traversed. In certain embodiments, consecutive header counters are initialized at operation 502. In certain embodiments, the consecutive header counters include a consecutive row header counter, CRHC. In certain embodiments, the consecutive header counters include a consecutive column header counter for each column index CCHC(i), where (i) corresponds to the column number of the cell on the table.

In the example of FIG. 5, the initial row and column indices of the cell at which the header label assignment system is to begin processing the table is set at operation 504. In certain embodiments, both the initial row index and initial column index are set to 1 so that processing begins at the first cell of the table indexed at R1C1. In certain embodiments, the header label assignment system may be configured to analyze only a sub-table included in a data set, in which case the row and column indices may be initialized to point to the first cell of the sub-table.

In certain embodiments, the initial row index and initial column index are used to retrieve a cell at the indexed row and column positions within the table at operation 506. At operation 508, a determination is made as to whether the cell at the indexed row and column position is a header. If the cell at the indexed row and column position is a data cell, processing may proceed to the data cell operations shown in FIG. 6 and described in detail herein. Otherwise, if a determination is made that the cell at the indexed row and column position is a header, the value of the CRHC is incremented at operation 510 and the value of the CCHC(i), for the indexed column is incremented at operation 512.

In certain embodiments, the header label assignment system may execute operations to update the column header array for the indexed column and/or the row header array for the indexed row. In certain embodiments, whether any of the header arrays are to be updated depends on one or more of the consecutive header counts CRCH and CCHC(i). In certain embodiments, a determination that a header from the row header array is to be removed is made at operation 514 based on the value of CRCH. In certain embodiments, the header label assignment system determines that a row header from the row header array is to be removed when the length of the row header array is greater than or equal to the value of CRCH. In certain embodiments, if the determination at operation 514 indicates that a row header from the row header array is to be removed, it is removed at operation 516.

In certain embodiments, which header is to be removed from the row header array for the indexed row is dependent on the value of CRCH. In certain embodiments, when the value of CRCH=1, the row header that is removed is the last row header in the current version of the row header array. In certain embodiments, when the value of CRCH=2, the row header that is removed is the second from last row header in the current version of the row header array. In certain embodiments, when the value of CRCH=n, the row header that is removed is the $n^{th}$ from last row header in the current version of the row header array.

In certain embodiments, the header label assignment system proceeds to determine whether a header from the column header array for the indexed column is to be removed at operation 518. In certain embodiments, a determination that a header from the column header array where the indexed column is to be removed is based on the value of CCCH(i) for the indexed column. In certain embodiments, the header label assignment system determines that a header from the column header array is to be removed when the length of the column header array for the indexed column is greater than or equal to the value of CCCH(i). In certain embodiments, if the determination at operation 518 indicates that a column header from the column header array is to be removed, it is removed at operation 520.

In certain embodiments, which header is to be removed from the column header array for the indexed column is dependent on the value of CCCH(i). In certain embodiments, when the value of CCCH(i)=1, the column header that is removed is the last column header in the current version of the column header array. In certain embodiments, when the value of CCCH(i)=2, the column header that is removed is the second from last column header in the current version of the column header array. In certain embodiments, when the value of CCCH(i)=x, the column header that is removed is the $x^{th}$ from last column header in the current version of the column header array.

In certain embodiments, the row header array and indexed column header array are updated with the value of the indexed cell once operations 514-520 have been addressed. To this end, the value of the indexed cell may be appended to the row header array at operation 522 and may be appended to the indexed column header array at operation 524.

In certain embodiments, the columns of each indexed row are sequentially traversed in the header assignment operations before proceeding to an analysis of the columns of the next indexed row. To this end, a determination is made at operation 526 whether the indexed row of the table has additional columns. If so, the column index is incremented at operation 528 and the newly incremented column index and current row index are used to retrieve the corresponding cell value at operation 506. If all of the columns of the indexed row have been analyzed, the header label assignment system may determine whether the table includes more rows that are to be analyzed at operation 530. If more rows are to be analyzed, the row index may be incremented at operation 532; the content of the row array may be reset at operation 534; and the column index may be reset to its initial value at and the CRCH reset at operation 536. In certain embodiments, the row index incremented at operation 532 and the value of the reset column index are used to retrieve the corresponding cell value at operation 506.

Figure 6:
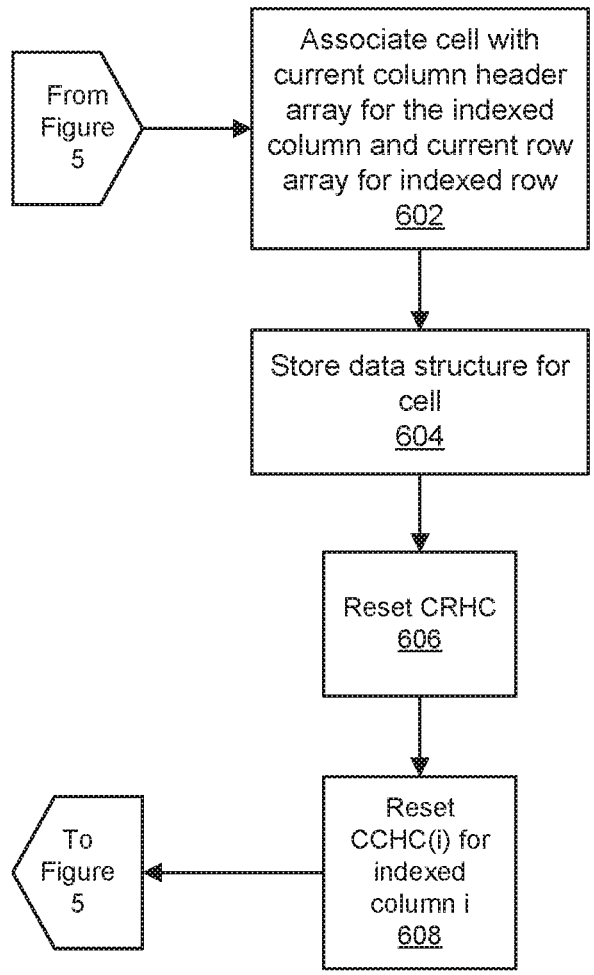
FIG. 6 is a flowchart depicting exemplary operations that may be executed when a determination is made that the cell at the indexed row and indexed column is a data cell.

FIG. 6 is a flowchart depicting exemplary operations that may be executed when a determination is made that the cell at the indexed row and indexed column retrieved at operation 506 (FIG. 5) is a data cell. In certain embodiments, the data cell and its corresponding data value are associated with the column headers of the column header array for the indexed column at operation 602. In certain embodiments, only the content of the column header array for the indexed column existing at the time the data cell is encountered are associated with the data cell. In certain embodiments, the data cell and its corresponding data value are also associated with the row headers of the row header array for the indexed row at operation 602. In certain embodiments, only the content of the row header array existing at the time the data cell is encountered are associated with the data cell.

In certain embodiments, a data structure for the data cell is constructed and stored at operation 604. In certain embodiments, the value of CRCH for the indexed row is reset at operation 606 and value of CCHC(i) for the indexed column is reset at operation 608 before returning to the operations of FIG. 5.

FIG. 7 shows one example of a data structure 700 that may be generated from the table information shown in FIG. 3 using certain embodiments of the header label assignment system. In the specific example shown in FIG. 6, the header label assignment system has provided a JSON output in which the individual data cells of the table are associated with one or more respective headers. In certain embodiments, as shown in row 702, header names "WHOLESALE", "IMPORTED", "BEANS", and "ROCHESTER" have been assigned to the data ($150) found in the cell indexed at R4,C2 of table 310.

In certain embodiments, the data structure 700 may be used by a QA system or search engine. When the QA system or search engine is asked to answer the question "What was the retail value of peas in Raleigh?" from the data structure 700, the system may search for a data cell that is associated with the headers "IMPORTED", "PEAS", "RALEIGH", and "RETAIL". In the example shown in data structure 700, the QA system or search engine will find that all of the headers the headers "IMPORTED", "PEAS", "RALEIGH", and "RETAIL" are located in row 704 and are associated with the data value "$900" thereby allowing the QA system or search engine to correctly answer the question notwithstanding the complex header arrangement of the original data table 310.

FIG. 8 depicts one example of pseudocode that may be used as a basis to implement certain embodiments of the header label assignment system. In certain embodiments, the header label assignment system executes initialization operations represented by instructions exemplified in pseudocode 805. In certain embodiments, the header label assignment system traverses each column within each row of the table using a nested loop. In certain embodiments, the nested loop includes an outer loop represented by instructions exemplified in pseudocode 810, which traverse each row of the table. In certain embodiments, the nested loop also includes instructions in an inner loop represented by instructions exemplified in pseudocode 815, which traverse each column of the current row designated by the outer loop. In certain embodiments, when a data cell is encountered, the header label assignment system executes operations to assign a list of current column and/or row headers to the data cell using instructions exemplified in pseudocode 820.

Although the present invention has been described in detail, it should be understood that various changes, substitutions and alterations can be made hereto without departing from the spirit and scope of the invention as defined by the appended claims.

What is claimed is:

1. A computer-implementable method for associating data cells with headers from tables having one or more embedded header structures, comprising:
   receiving a table having rows and columns, wherein the table includes a plurality of cells, wherein each cell is populated with at least one of a header name, data value, or no information, the table having at least one embedded header;
   determining whether a cell is a header cell or data cell;
   if the cell is a header cell,
     maintaining a count of consecutive column headers;
     dynamically updating a current list of column headers based on the count of the consecutive column headers;
   upon encountering a data cell, assigning the current list of column headers to the data cell;
   storing the data cells and corresponding assigned column headers in a data structure in electronic memory;

electronically receiving a natural language query;
extracting from the natural language query, using a natural language processing engine, two or more query words; and
searching the stored data structure for a data structure containing a list of headers that matches the two or more query words, and returning the cell data stored in the data structure as a question answer.

2. The method of claim 1, further comprising:
maintaining a count of consecutive row headers;
dynamically updating a current list of row headers based on the count of the consecutive row headers; and
upon encountering a data cell, assigning the current list of row headers to the data cell.

3. The method of claim 2, further comprising:
if the cell is a header cell,
incrementing the count of consecutive row headers for the row containing the cell;
comparing the incremented count of consecutive row headers for the real containing the cell with a length of an array holding the current list of row headers for the row containing the cell; and
if the length of the array holding the current list of row headers for the row containing the cell is greater than the count of consecutive row headers for the row containing the cell, updating the list of row headers for the row containing the cell by removing a preceding row header in the current list of column headers containing the cell with a name of the header cell, wherein the header removed from the current list of row headers is the $n^{th}$ from last header of the current list of column headers, where n is equal to the value of the count of consecutive row headers.

4. The method of claim 2, wherein
the count of consecutive row headers is reset after assigning the current list of row headers to the data cell.

5. The method of claim 1, further comprising:
if the cell is a header cell,
incrementing the count of consecutive column headers for the column containing the cell;
comparing the incremented count of consecutive column headers for the column containing the cell with a length of an array holding the current list of column headers for the column containing the cell;
if the length of the array holding the current list of column headers for the column containing the cell is greater than the count of consecutive column headers for the column containing the cell, removing a preceding column header in the current list of column headers containing the cell with a value of the header cell, wherein the header removed from the current list of column headers is the $x^{th}$ from last header of the current list of column headers, where x is equal to the value of the count of consecutive column headers.

6. The method of claim 1, wherein
the count of consecutive column headers is reset after assigning the current list of column headers to the data cell.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving a table having rows and columns, wherein the table includes a plurality of cells, wherein each cell is populated with one of a header name, data value, or no information, the table having at least one embedded header;
determining whether a cell is a header cell or data cell;
if the cell is a header cell,
maintaining a count of consecutive column headers;
dynamically updating a current list of column headers based on the count of the consecutive column headers;
upon encountering a data cell, assigning the current list of column headers to the data cell;
storing the data cells and corresponding assigned column headers in a data structure in electronic memory;
electronically receiving a natural language query;
extracting from the natural language query, using a natural language processing engine, two or more query words; and
searching the stored data structure for a data structure containing a list of headers that matches the two or more query words, and returning the cell data stored in the data structure as a question answer.

8. The system of claim 7, wherein the instructions are further configured for:
maintaining a count of consecutive row headers;
dynamically updating a current list of row headers based on the count of the consecutive row headers; and
upon encountering a data cell, assigning the current list of row headers to the data cell.

9. The system of claim 8, wherein the instructions are further configured for:
if the cell is a header cell,
incrementing the count of consecutive row headers for the row containing the cell;
comparing the incremented count of consecutive row headers for the real containing the cell with a length of an array holding the current list of row headers for the row containing the cell; and
if the length of the array holding the current list of row headers for the row containing the cell is greater than the count of consecutive row headers for the row containing the cell, updating the list of row headers for the row containing the cell by removing an immediately preceding row header in the current list of column headers containing the cell with a value of the header cell, wherein the header removed from the current list of row headers is the $n^{th}$ from the end header, where n is equal to the value of the count of consecutive row headers.

10. The system of claim 8, wherein:
the count of consecutive column headers is reset after assigning the current list of column headers to the data cell.

11. The system of claim 7, wherein the instructions are further configured for:
if the cell is a header cell,
incrementing the count of consecutive column headers for the column containing the cell;
comparing the incremented count of consecutive column headers for the column containing the cell with a length of an array holding the current list of column headers for the column containing the cell;

if the length of the array holding the current list of column headers for the column containing the cell is greater than the count of consecutive column headers for the column containing the cell, removing a preceding column header in the current list of column headers containing the cell with a value of the header cell, wherein the header removed from the current list of column headers is the $x^{th}$ from last header of the current list of column headers, where x is equal to the value of the count of consecutive column headers.

12. The system of claim 7, wherein:
the count of consecutive column headers is reset after assigning the current list of column headers to the data cell.

13. A non-transitory, computer-readable storage medium embodying computer program code, the computer program code comprising computer executable instructions configured for:
receiving a table having rows and columns, wherein the table includes a plurality of cells, wherein each cell is populated with one of a header name, data value, or no information, the table having at least one embedded header;
determining whether a cell is a header cell or data cell;
if the cell is a header cell,
maintaining a count of consecutive column headers;
dynamically updating a current list of column headers based on the count of the consecutive column headers;
upon encountering a data cell, assigning the current list of column headers to the data cell;
storing the data cells and corresponding assigned column headers in a data structure in electronic memory;
electronically receiving a natural language query;
extracting from the natural language query, using a natural language processing engine, two or more query words; and
searching the stored data structure for a data structure containing a list of headers that matches the two or more query words, and returning the cell data stored in the data structure as a question answer.

14. The non-transitory, computer-readable storage medium of claim 13, wherein the computer executable instructions are further configured for:
maintaining a count of consecutive row headers;
dynamically updating a current list of row headers based on the count of the consecutive row headers; and
upon encountering a data cell, assigning the current list of row headers to the data cell.

15. The non-transitory, computer-readable storage medium of claim 14, the computer executable instructions are further configured for:
if the cell is a header cell,
incrementing the count of consecutive row headers for the row containing the cell;
comparing the incremented count of consecutive row headers for the real containing the cell with a length of an array holding the current list of row headers for the row containing the cell; and
if the length of the array holding the current list of row headers for the row containing the cell is greater than the count of consecutive row headers for the row containing the cell, updating the list of row headers for the row containing the cell by removing a preceding row header in the current list of column headers containing the cell with a name of the header cell, wherein the header removed from the current list of row headers is the $n^{th}$ from last header of the current list of row headers, where n is equal to the value of the count of consecutive row headers.

16. The non-transitory, computer-readable storage medium of claim 13, wherein
the computer executable instructions are further configured for:
if the cell is a header cell,
incrementing the count of consecutive column headers for the column containing the cell;
comparing the incremented count of consecutive column headers for the column containing the cell with a length of an array holding the current list of column headers for the column containing the cell;
if the length of the array holding the current list of column headers for the column containing the cell is greater than the count of consecutive column headers for the column containing the cell, removing a preceding column header in the current list of column headers containing the cell with a value of the header cell, wherein the header removed from the current list of column headers is the $x^{th}$ from last header of the current list of column headers, where x is equal to the value of the count of consecutive column headers.

17. The non-transitory, computer-readable storage medium of claim 13, wherein
the count of consecutive column headers is reset after assigning the current list of column headers to the data cell.

* * * * *